US012120785B2

(12) United States Patent
Cadima

(10) Patent No.: US 12,120,785 B2
(45) Date of Patent: Oct. 15, 2024

(54) COOKING SYSTEM WITH COOKTOP APPLIANCE AND PROGRAMMED MAGNET

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 189 days.

(21) Appl. No.: 17/682,469

(22) Filed: Feb. 28, 2022

(65) Prior Publication Data

US 2023/0276541 A1 Aug. 31, 2023

(51) Int. Cl.
*H05B 3/68* (2006.01)
*H05B 3/74* (2006.01)

(52) U.S. Cl.
CPC ............... *H05B 3/685* (2013.01); *H05B 3/74* (2013.01)

(58) Field of Classification Search
CPC ........ H05B 6/062; H05B 6/12; H05B 6/1209; H05B 6/1245; H05B 6/1263; H05B 3/68; H05B 3/685; H05B 3/74; H05B 3/746; H05B 3/748; H05B 3/76
See application file for complete search history.

(56) References Cited

U.S. PATENT DOCUMENTS

| | | | | |
|---|---|---|---|---|
| 8,735,779 | B2 | 5/2014 | Rael | |
| 9,202,615 | B2 | 12/2015 | Fullerton et al. | |
| 2012/0261424 | A1* | 10/2012 | Rael | H05B 3/685 126/217 |
| 2018/0010804 | A1* | 1/2018 | Bach | F24C 3/126 |
| 2019/0357319 | A1* | 11/2019 | Bassill | H05B 6/062 |

FOREIGN PATENT DOCUMENTS

| | | | |
|---|---|---|---|
| WO | WO2008110450 | A2 | 9/2008 |
| WO | WO2019091800 | A1 | 5/2019 |

OTHER PUBLICATIONS

Align Polymagnets, Polymagnets Correlated Magnetics, Oct. 28, 2014, 3 pages http://www.polymagnet.com/blog/align.

* cited by examiner

*Primary Examiner* — Hung D Nguyen
(74) *Attorney, Agent, or Firm* — Dority & Manning, P.A.

(57) ABSTRACT

A cooktop appliance defining a reference center and a radial direction extending from the reference center, a circumferential direction extending relative to the reference center, and a vertical direction extending orthogonal to the radial direction is provided. The cooktop appliance includes a ceramic-glass plate, a heating assembly positioned below the ceramic-glass plate, and a programmed magnet centered at the reference center. The programmed magnet is configured to generate a magnetic force along the radial direction.

19 Claims, 9 Drawing Sheets

COOKING SYSTEM WITH COOKTOP APPLIANCE AND PROGRAMMED MAGNET

FIELD OF THE INVENTION

The present subject matter relates generally to cooktop appliances, such as radiant or induction cooktop appliances, and cooking systems for positioning cookware relative to the cooktop appliance.

BACKGROUND OF THE INVENTION

Certain cooktop appliances, such as those including glass cooktop surfaces, are generally desirable for their relative ease of cleaning and uninterrupted cookware surfaces. Cooktop appliances may generally include one or more discrete burner elements at which graphical indicators are applied to the cooktop surface corresponding to the location of each burner. However, such burner elements and corresponding markings may be smaller than the cookware placed upon the cooktop surface. When the cookware is larger than the markings, the cookware may obscure the location of the burner element or its center point, and uneven heating of the cookware may result, which may result in uneven cooking and undesired cookware performance.

Additionally, cooktop appliances may lack friction between the cookware and the cooktop surface. Cookware may easily slide out of position, or the cookware may spin or move from the center point when a user stirs or moves contents within the cookware.

Some cooktop appliances, such as gas burners, may have separate, discrete heating elements without a continuous cooktop surface. Still some cooktop appliances may be used in vehicles, such as recreational vehicles (RVs), trailers, boats, or ships, which may move and result in a slope. Certain cooktop appliances may include clamps, hinges, arms, or other structures to physically hold, pull, or compress the cookware onto the cookware surface or heating element. However, such devices may be cumbersome, unattractive, may limit the size of the cookware that may be utilized, or limit an amount of cooktop surface that may be utilized.

Accordingly, structures for positioning cookware at a cooktop appliance are desired. Particularly, systems and structures allowing for desired positioning and movement of cookware at a cooktop appliance are desired. Furthermore, a cooktop appliance having structures for positioning cookware are desired. Still further, cookware providing desired positioning onto the cooktop appliance is desired.

BRIEF DESCRIPTION OF THE INVENTION

An aspect of the present disclosure is directed to a cooktop appliance defining a reference center and a radial direction extending from the reference center, a circumferential direction extending relative to the reference center, and a vertical direction extending orthogonal to the radial direction. The cooktop appliance includes a ceramic-glass plate, a heating assembly positioned below the ceramic-glass plate, and a programmed magnet centered at the reference center. The programmed magnet is configured to generate a magnetic force along the radial direction.

Another aspect of the present disclosure is directed to a cooking system defining a reference center and a radial direction extending from the reference center, a circumferential direction extending relative to the reference center, and a vertical direction extending orthogonal to the radial direction. The cooking system includes a cooktop appliance having a ceramic-glass plate, a heating assembly positioned below the ceramic-glass plate, and a first programmed magnet centered at the reference center, the first programmed magnet configured to generate a magnetic force along the radial direction. The cooking system includes a cookware device including a bottom surface in which a plenum is formed at the reference center at the cookware device and a second programmed magnet is positioned in the plenum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
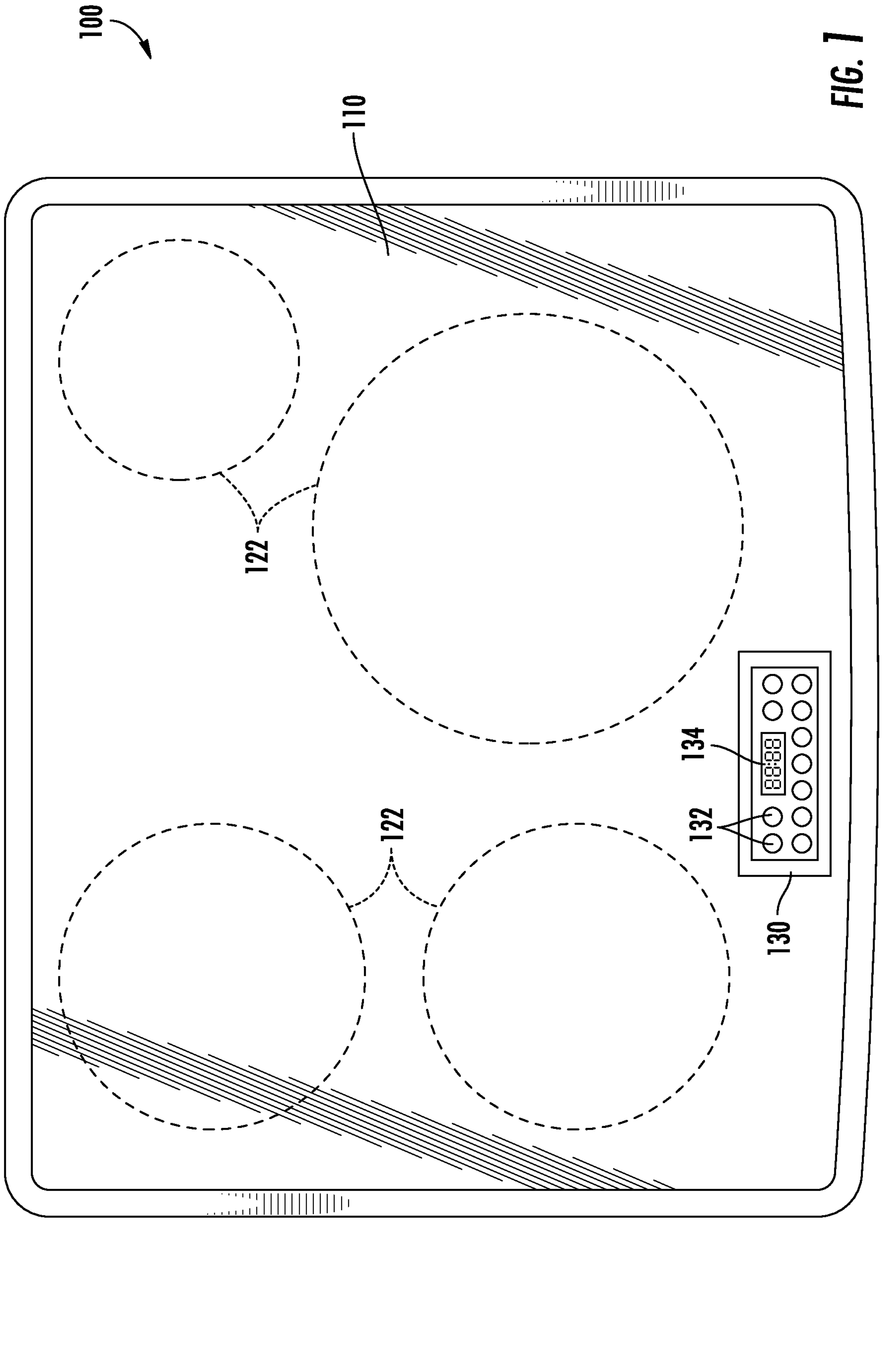
FIG. 1 provides a top, plan view of a cooktop appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a top, plan view of a cooktop appliance 100 according to an exemplary embodiment of the present subject matter. Cooktop appliance 100 can be installed in various locations such as in cabinetry in a kitchen, with one or more ovens to form a range appliance, or as a standalone appliance. Thus, as used herein, the term “cooktop appliance” includes grill appliances, stove appliances, range appliances, and other appliances that incorporate cooktops.

Figure 3:
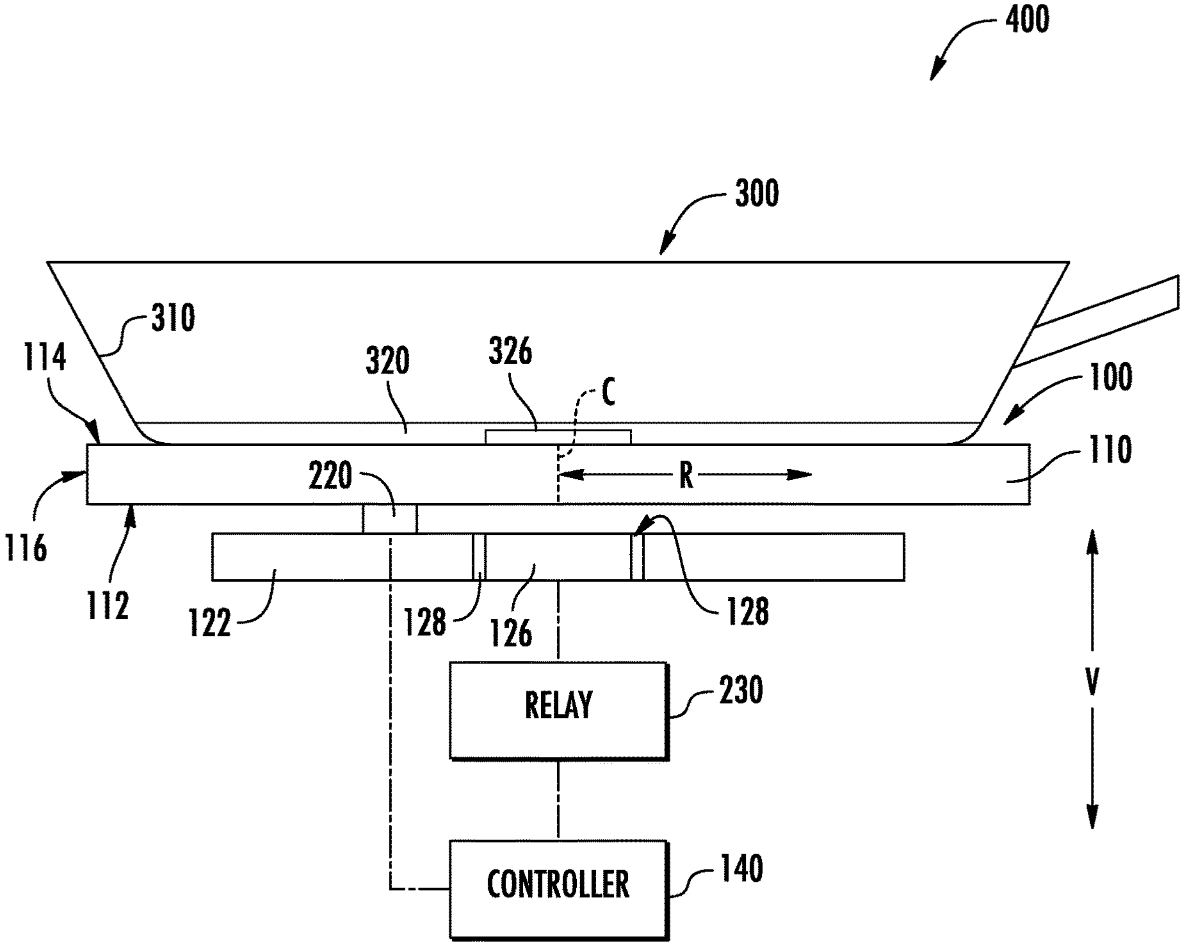
FIG. 3 provides a schematic view of a cooking system including certain components of the exemplary cooktop appliance and cookware device according to an exemplary embodiment of the present subject matter.

Cooktop appliance 100 includes a ceramic-glassplate 110 for supporting cooking utensils, such as pots or pans, on a cooking or top surface 114 of ceramic-glass plate 110. Ceramic-glass plate 110 may be any suitable ceramic-glass or glass plate. Radiant heating assemblies 122 are mounted below ceramic-glass plate 110 such that heating assemblies 122 are positioned below ceramic-glass plate 110, e.g., along a vertical direction V (FIG. 3). Ceramic-glass plate 110 may be continuous over heating assemblies 122. Thus, no holes may extend vertically through ceramic-glass plate 110 above heating assemblies 122.

While shown with four heating assemblies 122 in the exemplary embodiment of FIG. 1, cooktop appliance 100 may include any number of heating assemblies 122 in alternative exemplary embodiments. Heating assemblies 122 can also have various diameters. For example, each heating assembly of heating assemblies 122 can have a different diameter, the same diameter, or any suitable combination thereof. In addition, heating assembly 122 may include one radiant heating element or zone, two radiant heating elements or zones, or three radiant heating elements or zones, or more. Cooktop appliance 100 is provided by way of example only and is not limited to the exemplary embodiment shown in FIG. 1. For example, a cooktop appliance having one or more radiant heating assemblies in combination with one or more electric resistance or gas burner heating elements can be provided. In addition, various combinations of number of heating assemblies, position of heating assemblies and/or size of heating assemblies can be provided. It will also be understood that the present subject matter is suitable for use with other electric heating elements, such as induction heating elements.

A user interface 130 provides visual information to a user and allows a user to select various options for the operation of cooktop appliance 100. For example, displayed options can include a desired heating assembly 122, a desired cooking temperature, and/or other options. User interface 130 can be any type of input device and can have any configuration. In FIG. 1, user interface 130 is located within a portion of ceramic-glass plate 110. Alternatively, user interface 130 can be positioned on a vertical surface near a front side of cooktop appliance 100 or anywhere convenient for a user to access during operation of cooktop appliance 100.

In the exemplary embodiment shown in FIG. 1, user interface 130 includes a capacitive touch screen input device component 132. Capacitive touch screen input device component 132 can allow for the selective activation, adjustment or control of any or all heating assemblies 122, including any timer features, heat output settings, or other user adjustable inputs. One or more of a variety of electrical, mechanical or electro-mechanical input devices including rotary dials, push buttons, toggle/rocker switches, and/or touch pads can also be used singularly or in combination with capacitive touch screen input device component 132. User interface 130 also includes a display component 134, such as a digital or analog display device designed to provide operational feedback to a user.

Figure 2:
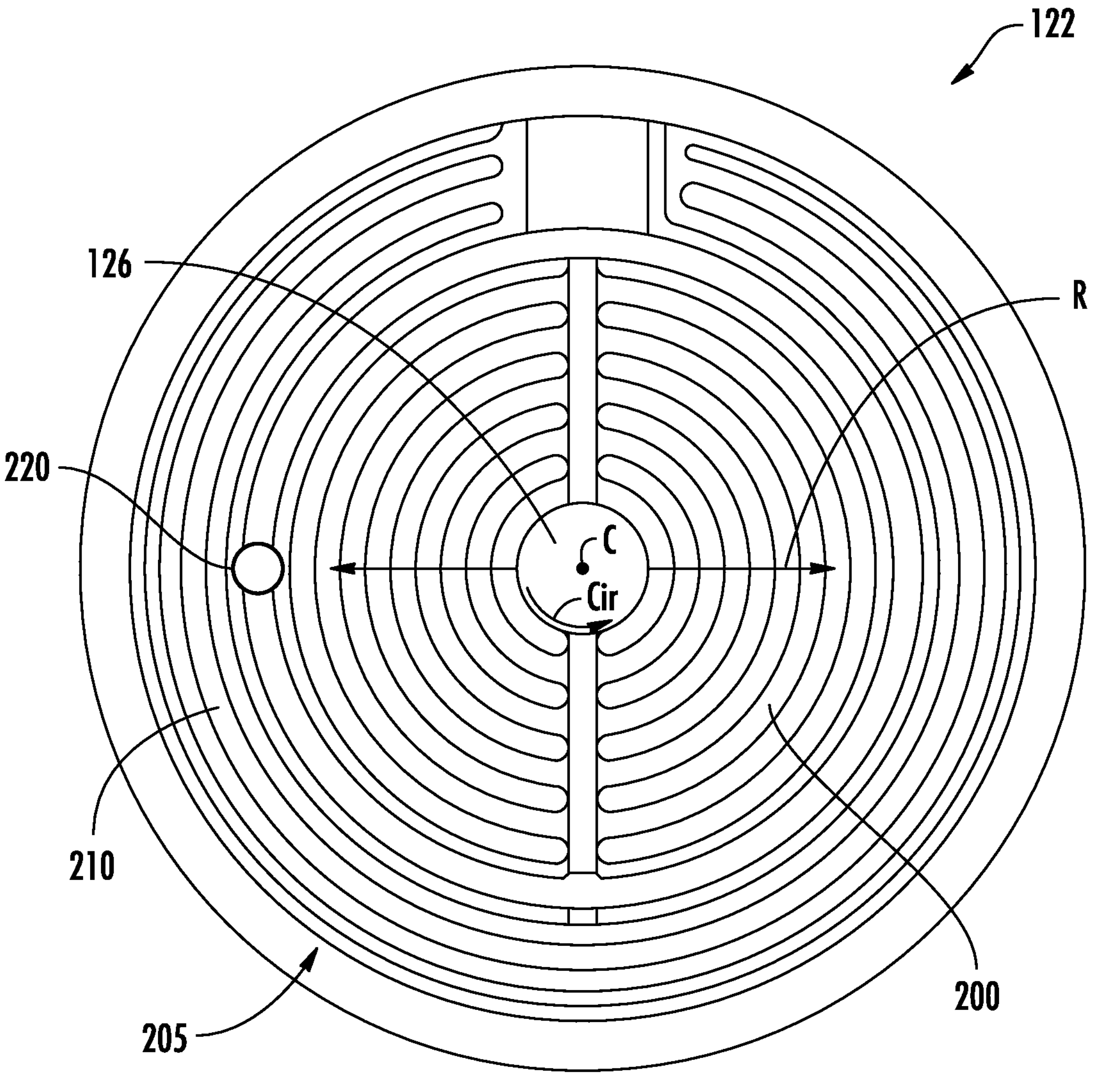
FIG. 2 provides a top, plan view of a heating assembly of a cooktop appliance according to an exemplary embodiment of the present subject matter.

FIG. 2 provides a top, plan view of heating assembly 122 of cooktop appliance 100 (FIG. 1). As may be seen in FIG. 2, heating assembly 122 includes a heating element 205 configured to release heat or thermal energy. As provided above, heating element 205 may be configured as any appropriate radiant heating device, such as an electric heating element. In an exemplary embodiment, the heating element 205 includes a first or inner heating element 200 and a second or outer heating element 210. Outer heating element 210 of heating assembly 122 is positioned concentrically relative to inner heating element 200 of heating assembly 122. In particular, inner heating element 200 of heating assembly 122 and outer heating element 210 of heating assembly 122 are spaced apart from each other, e.g., along a radial direction R extending from reference center C, such that outer heating element 210 of heating assembly 122 extends along circumferential direction Cir around at least a portion of inner heating element 200 of heating assembly 122.

Referring still to FIG. 2, and further depicted in FIG. 3, a programmed magnet 126 is centered at the reference center C. The programmed magnet 126, such as a first programmed magnet, is configured for alignment along the radial direction R with a corresponding programmed magnet, such as a second programmed magnet 326. The programmed magnet is configured to have a relatively large shear force compared to a force along the radial direction R. Accordingly, the programmed magnet allows for relatively easy removal of cookware along vertical direction V while inhibiting movement of the cookware along radial direction R. As such, the programmed magnet fixes the cookware substantially along reference center C while avoiding or eliminating the generation of additional forces along vertical direction V. In certain embodiments, the programmed magnet 126 produces little or no forces along the vertical direction V pulling cookware to the ceramic-glass plate 110 while attracting cookware toward reference center C or repelling from movement away from the reference center C along the radial direction R.

Referring now to FIG. 3, a schematic view of a cooking system 400 is provided. FIG. 3 provides a schematic view of certain components of cooktop appliance 100 and a cookware device 300. Cooktop appliance 100 includes a first programmed magnet 126 positioned below the ceramic-glass plate 110. The heating assembly 122 forms an opening 128 extended along the vertical direction V at the reference center C. The programmed magnet 126 is positioned at the opening 128, such as further described herein.

Cookware device 300 includes a cooking surface 310 at which contents are placed, retained, processed, and otherwise provided, such as for cooking, heating, or other appropriate uses in accordance with pots, pans, saucepans, or other cooking devices. Cookware device 300 includes a bottom surface 320 at which a second programmed magnet 326 is positioned at the reference center C at the cookware device 300.

The second programmed magnet 326 is configured to react to the first programmed magnet 126 along the radial direction R to position the second programmed magnet 326, and the cookware device 300 attached and surrounding the second programmed magnet 326, concentric to the first programmed magnet 126 and the heating assembly 122, such as concentric relative to the reference center C.

Figure 4:
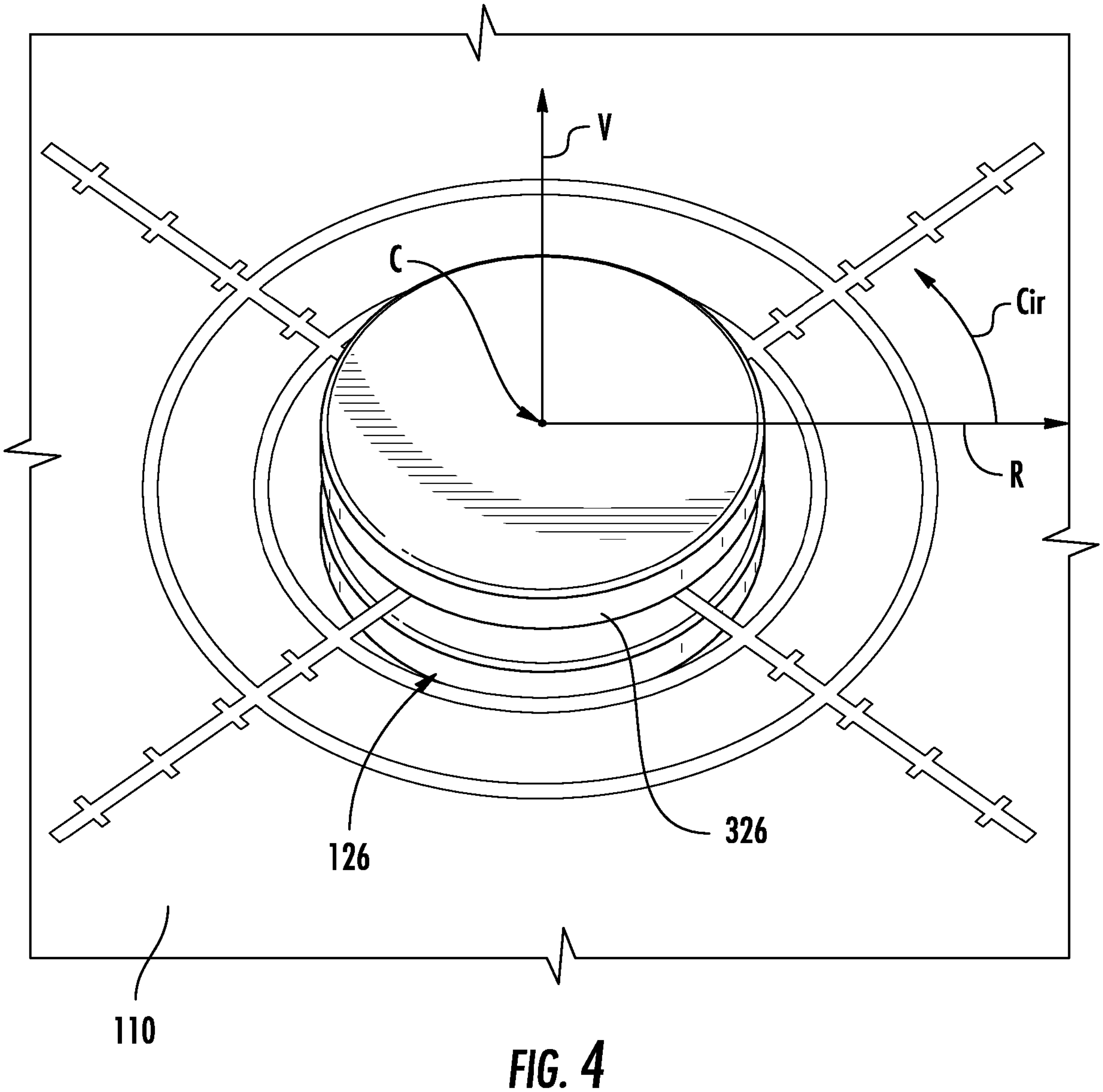
FIG. 4 provides a perspective view of a portion of the cooking system according to an exemplary embodiment of the present subject matter.

In a particular embodiment, such as depicted in FIG. 3, the first programmed magnet 126 and the second programmed magnet 326 are separated along the vertical direction V when the cookware device 300 is positioned on the ceramic-glass plate 110. FIG. 4 provides a perspective view of the programmed magnets 126, 326 with surrounding respective cooktop appliance 100 and cookware device 300 omitted for clarity. In one embodiment, the programmed magnet is configured to generate a radial magnetic force along the radial direction R between the first programmed magnet 126 and second programmed magnet 326 is substantially greater in attractive force toward the reference center C than a vertical magnetic force along the vertical direction V. In another embodiment, the programmed magnet is configured to generate a radial magnetic force along the radial direction R between the first programmed magnet 126 and second programmed magnet 326 is substantially greater in repelling movement along the radial direction R, such as to encourage concentricity or mitigate eccentricity of the second programmed magnet 326 and cookware device 300 with the first programmed magnet 126 and heating assembly 122, than a vertical magnetic force along the vertical direction V.

Cooktop appliance 100 may include a controller 140. Operation of cooktop appliance 100 is regulated by controller 140. Controller 140 is operatively coupled or in communication with various components of cooktop appliance 100, including user interface 130. In response to user manipulation of the user interface 130, controller 140 operates the various components of cooktop appliance 100 to execute selected cycles and features.

Controller 140 may include a, e.g., non-transitory, memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. User input 130 and other components of cooktop appliance 100 may be in communication with controller 140 via one or more signal lines or shared communication busses.

As shown in FIGS. 2 and 3, cooktop appliance 100 includes a temperature sensor 220. Temperature sensor 220 may be any suitable type of temperature sensor, such as a thermocouple, a thermistor, etc. In certain embodiments, temperature sensor 220 is positioned proximate a bottom surface 112 of ceramic-glass plate 110 above heating assembly 122. However, in other embodiments, temperature sensor 220 may be positioned in any appropriate location. Signal(s) from temperature sensor 220 corresponds to a temperature of ceramic-glass plate 110 and/or to a temperature of a cooking utensil or cookware device on ceramic-glass plate 110 above heating assembly 122.

In a particular embodiment, temperature sensor 220 is positioned above heating assembly 122 such that temperature sensor 220 may be offset from a center C of heating assembly 122, e.g., along the radial direction R. Temperature sensor 220 may also be inset from an outer edge 116 of heating assembly 122, e.g., along the radial direction R. Thus, temperature sensor 220 may be positioned between center C of heating assembly 122 and outer edge 116 of heating assembly 122 along the radial direction R. Center C of heating assembly 122 may correspond to a radial center of heating assembly 122, and outer edge 116 of heating assembly 122 may correspond to an outermost portion of heating assembly 122 relative to center C along the radial direction R. As an example, temperature sensor 220 may be positioned at a junction between inner and outer heating elements 200, 210 of heating assembly 122 along the radial direction R.

Temperature sensor 220 may be offset from center C of heating assembly 122 along the radial direction R. Spacing the temperature sensor 220 from center C of heating assembly 122 may increase accuracy of temperature sensor 220 when a cooking utensil on ceramic-glass plate 110 above heating assembly 122 has a curved, e.g., concave, bottom surface, above center C of heating assembly 122, and e.g., the cooking utensil does not contact ceramic-glass plate 110 directly above center C of heating assembly 122.

Temperature sensor 220 may be mounted to and/or contact bottom surface 112 of ceramic-glass plate 110. Thus, temperature sensor 220 may be positioned between ceramic-glass plate 110 and heating assembly 122, e.g., along the vertical direction V. In alternative exemplary embodiments, temperature sensor 220 may be mounted to other components of cooktop appliance 100, such as heating assembly 122, and may be spaced from ceramic-glass plate 110 along the vertical direction V.

Figure 5:
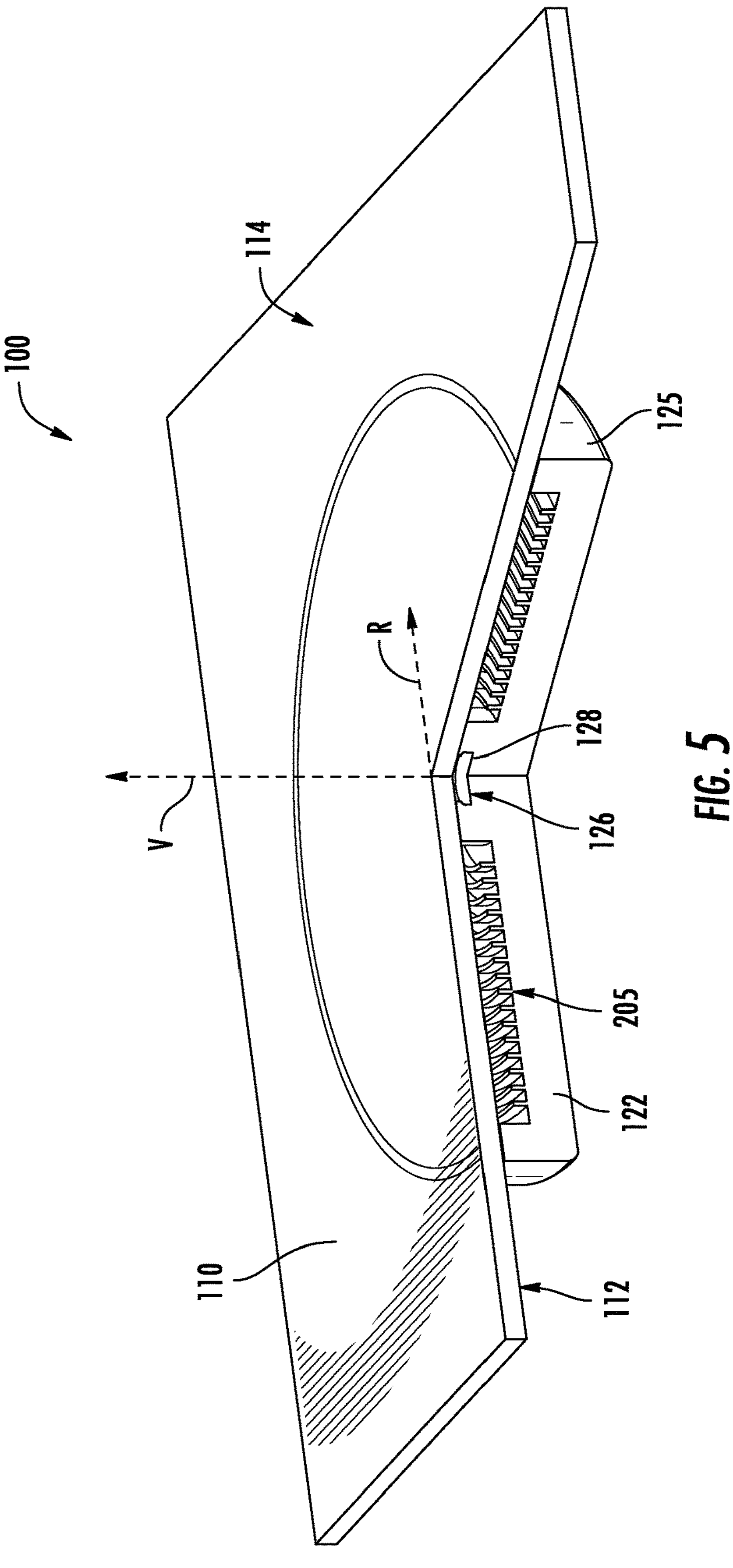
FIG. 5 provides a cutaway perspective view of a cooktop appliance according to an exemplary embodiment of the present subject matter.
Figure 6:
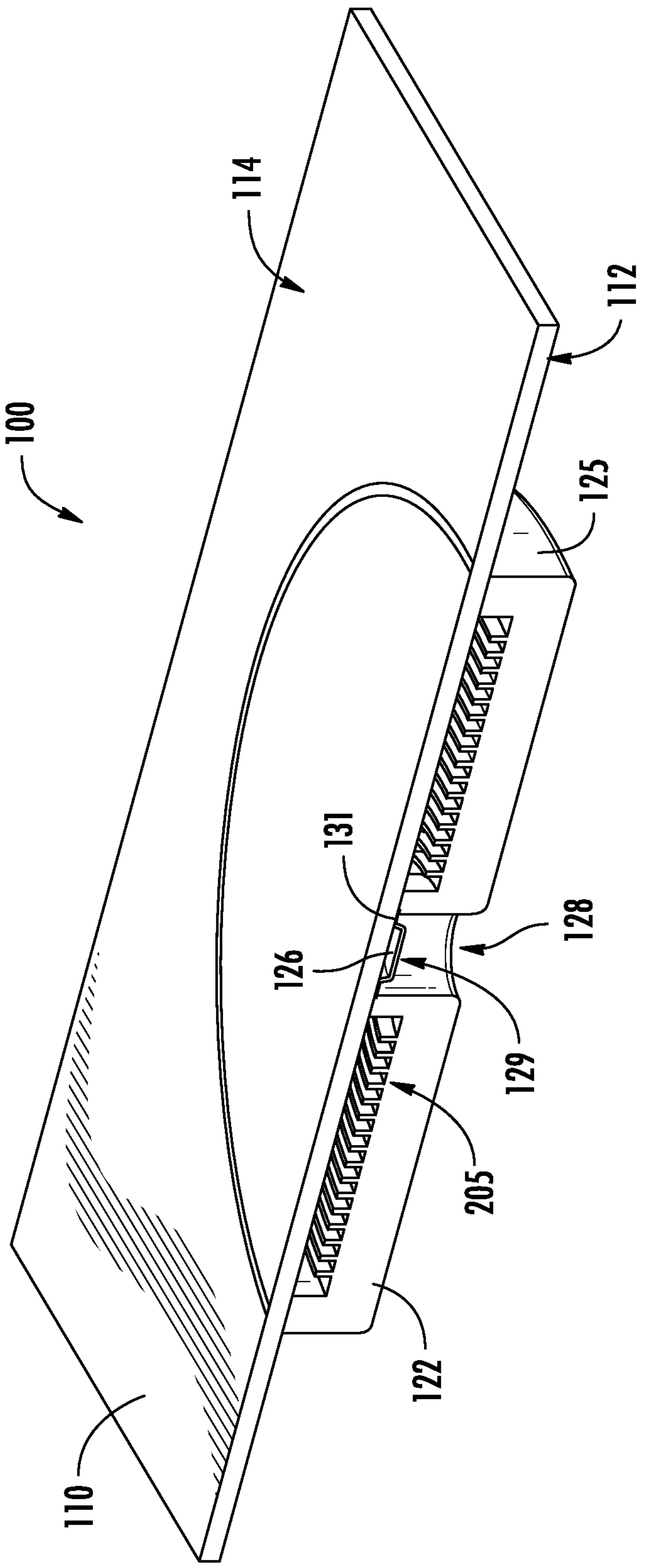
FIG. 6 provides a cutaway perspective view of a cooktop appliance according to an exemplary embodiment of the present subject matter.
Figure 7:
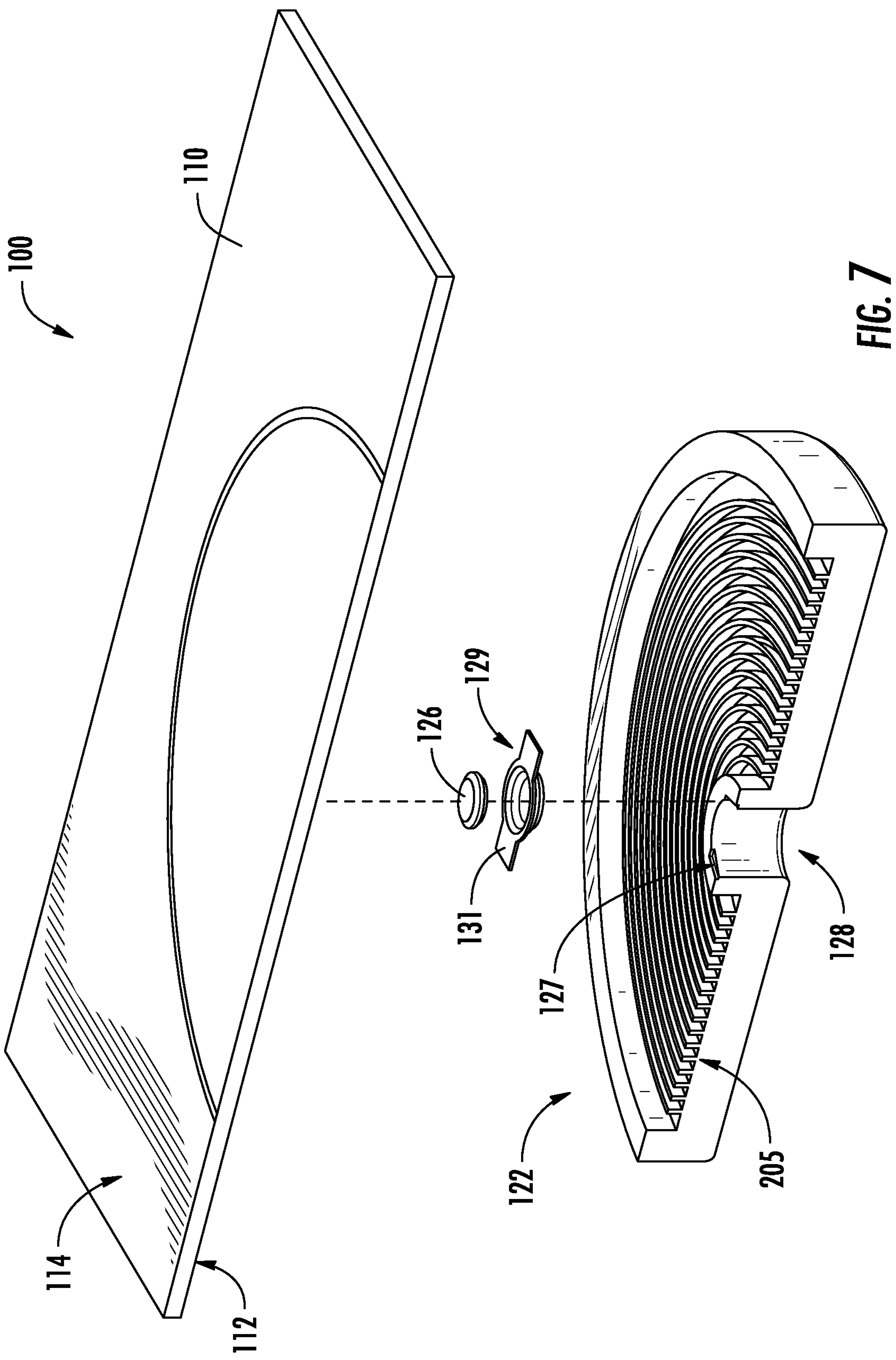
FIG. 7 provides an exploded cutaway perspective view of a cooktop appliance according to an exemplary embodiment of the present subject matter.

FIGS. 5-6 each provide a cutaway perspective view of an exemplary embodiment of the cooktop appliance 100. FIG. 7 provides an exploded cutaway perspective view of an exemplary embodiment of the cooktop appliance 100. Referring to FIGS. 5-7, heating assembly 122 may include a housing or body 125 configured to position and retain the heating element 205 and the first programmed magnet 126 such as described herein. In particular embodiments, opening 128 is extended through the body 125 along the vertical direction V. Referring to FIG. 5, the opening 128 may form a counterbore extending along the vertical direction V. The first programmed magnet 126 is positionable within the opening 128 forming the counterbore.

Referring to FIGS. 6-7, the opening 128 may extend entirely through the body 125 along the vertical direction V. A retainer body 129 is positioned at the opening 128 at an upper face 127 of the body 125. The upper face 127 is proximate to the bottom surface 112 of the ceramic-glass plate 110. The first programmed magnet 126 is positioned in the retainer body 129. The upper face 127 may particularly form a counterbore. Retainer body 129 may include a detent 131, such as a wing, a flange, or clip, configured to allow the retainer body 129 to rest at a flange or surface at the upper face 127 of the body 125. The retainer body 129 may allow the first programmed magnet 126 to position at the reference center C.

Figure 8:
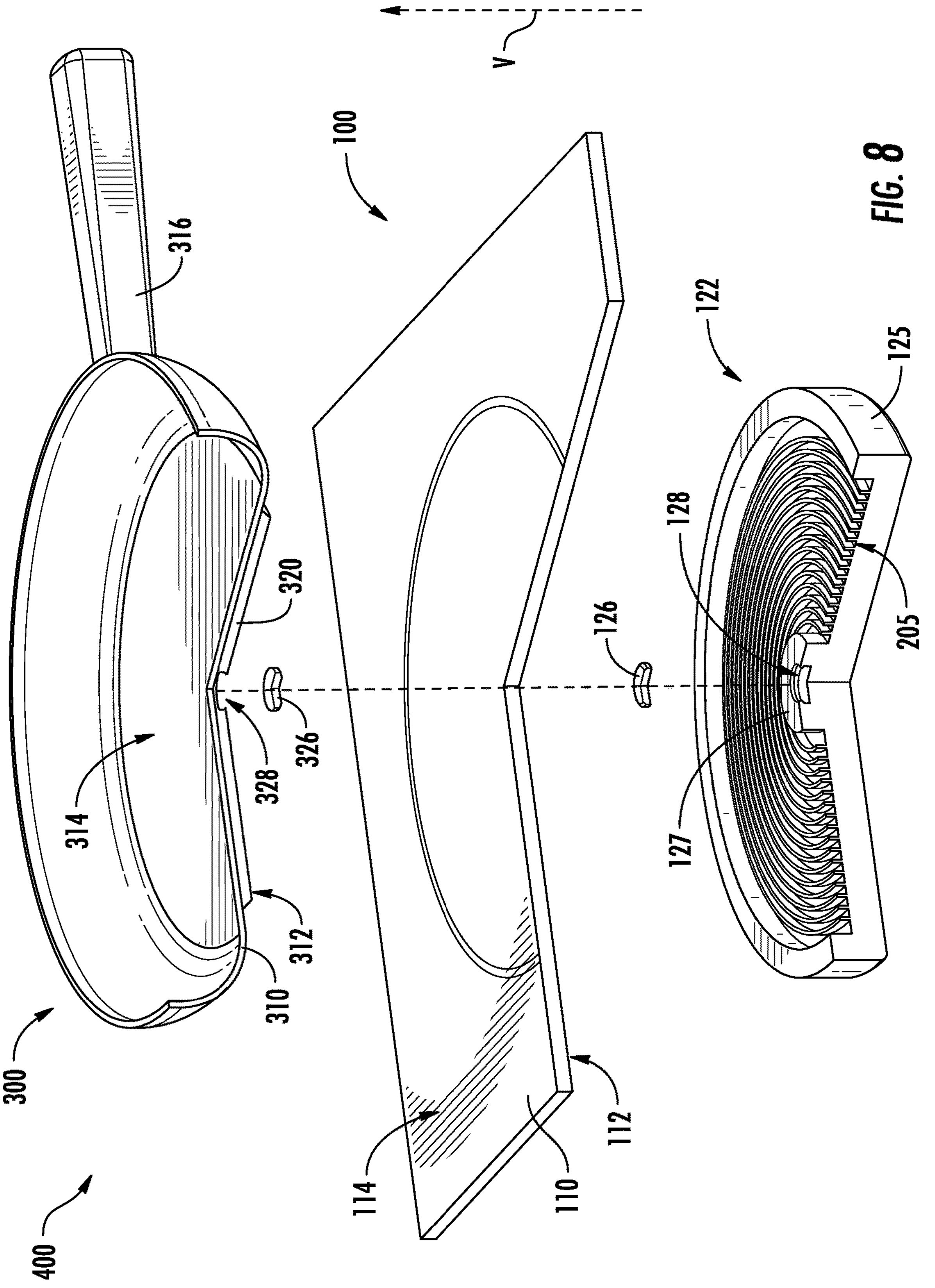
FIG. 8 provides an exploded cutaway perspective view of a cooking system according to an exemplary embodiment of the present subject matter.
Figure 9:
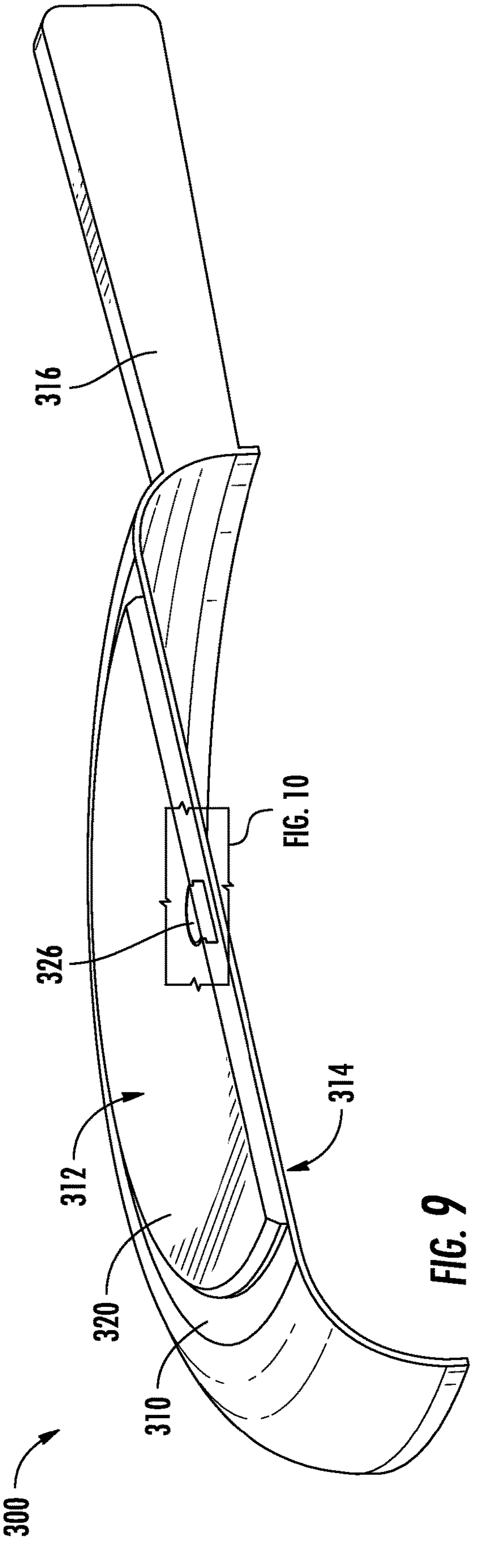
FIG. 9 provides a cutaway perspective view of a cookware device according to an exemplary embodiment of the present subject matter.
Figure 10:
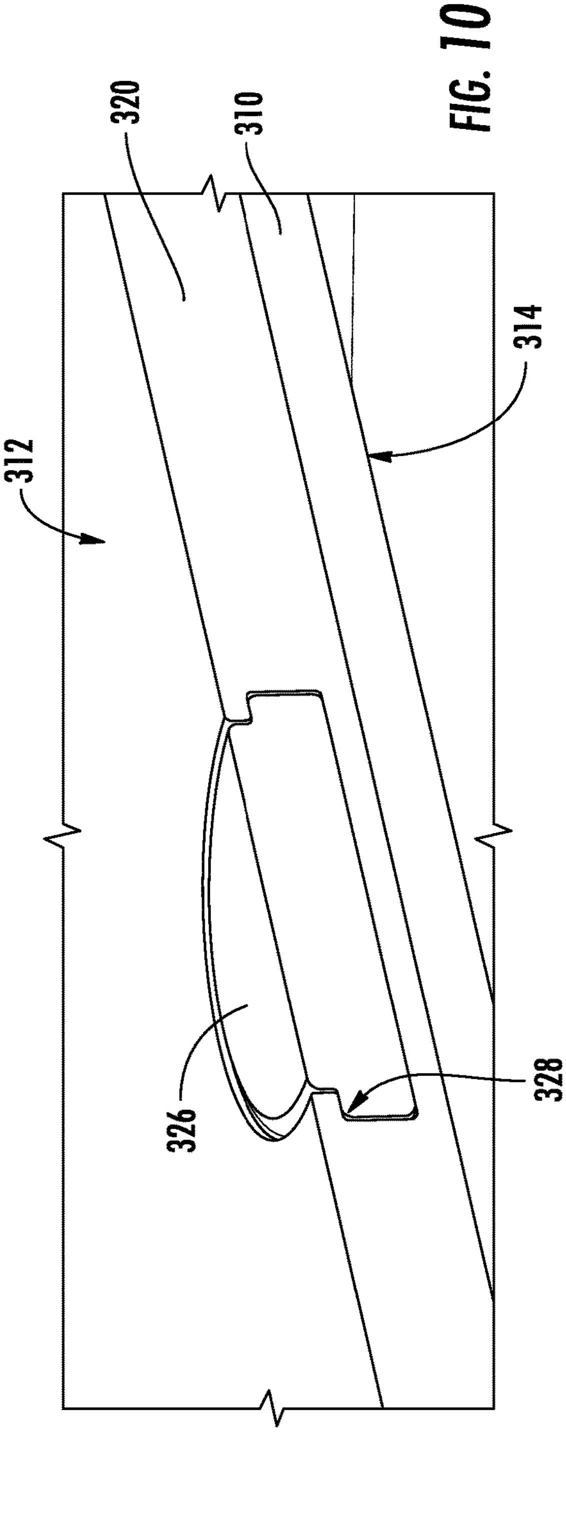
FIG. 10 provides a detailed cutaway perspective view of a portion of the cookware device of FIG. 9 according to an exemplary embodiment of the present subject matter.

FIG. 8 provides an exploded cutaway perspective view of an embodiment of the cooking system 400 including the cookware device 300 and the cooktop appliance 100. Cooktop appliance 100 may be configured in accordance with any one or more embodiments of the cooktop appliance provided herein. In FIG. 8, cooktop appliance 100 is configured substantially as depicted and described in regard to FIG. 5. In FIG. 8, the ceramic-glass plate 110 separates the first programmed magnet 126 and the second programmed magnet 326 along the vertical direction V. FIG. 9 provides a cutaway perspective view of an embodiment of the cookware device 300. FIG. 10 provides a detailed perspective view of a portion of the cookware device 300 of FIG. 9. The cookware device may include a handle 316 extending from the cooking surface 310. The cookware device 300 includes a first side 312 configured to receive heat from the heating assembly 122 and rest onto the ceramic-glass plate 110. The cookware device 300 includes a second side 314 configured to receive food items or other matter appropriate for a cookware device 300.

In certain embodiments, a plenum 328 is formed at the reference center C at bottom surface 320 at the cookware device 300. The second programmed magnet 326 is positioned and received in the plenum 328. The plenum 328 may be open at the first side 312 such as to allow the second programmed magnet 326 to be exposed through the first side 312.

The cookware device 300, or particularly the cooking surface 310 and the bottom surface 320, may be formed of any appropriate material suitable for cookware, such as, but not limited to, aluminum, copper, stainless steel, ceramic-glass, glass, or combinations thereof. One or more coatings, such as ceramic-glass coatings, diamond coatings, or non-stick and thermal coatings generally, may be applied to cooking surface 310 and/or the bottom surface 320. The cookware device 300 may be formed of any one or more appropriate manufacturing methods, including, but not limited to, stamping, drawing, casting, milling, turning, drilling, etc.

The programmed magnets 126, 326 may include any appropriate magnetic structure that incorporates correlated patterns of magnets with alternating polarity configured such as described herein. Programmed magnets, polymagnets, or correlated magnets, may be formed from any one or more ferrite materials, rare-earth materials, ceramics, or electromagnets.

Embodiments of the cooktop appliance 100, cookware device 300, and cooking system 400 provided herein allows the cookware device 300 to slide freely along the cooktop appliance 100 and urge the cookware device 300 to the center C when the second programmed magnet 326 at the cookware device 300 is positioned proximate to the first programmed magnet 126. The radial force required by a user to pull the cookware device 300 apart from the cooktop appliance 100 is relatively low or insubstantial for the user to overcome while allowing the cookware device 300 to be secured to the cooktop appliance 100, such as to mitigate movement when a user may stir or handle contents within the cookware device 300. In particular embodiments, the cooking system 400 may secure the cookware device 300 concentric to the cooktop appliance 100 while off-level by up to approximately 40 degrees or more (e.g., a cooktop appliance 100 in a boat, ship, recreational vehicle, tractor trailer, etc. or other vehicle or surface positioned at up to approximately 40 degrees or more slope). Embodiments provided herein may allow for relatively even heating and tactile feedback between the user and the cookware device 300, mitigated eccentricity, and improved handling in vehicles.

Further aspects of the invention are provided by one or more of the following clauses:

1. A cooktop appliance defining a reference center and a radial direction extending from the reference center, a circumferential direction extending relative to the reference center, and a vertical direction extending orthogonal to the radial direction, the cooktop appliance including a ceramic-glass plate; a heating assembly positioned below the ceramic-glass plate; a programmed magnet centered at the reference center, the programmed magnet configured to generate a magnetic force along the radial direction.
2. The cooktop appliance of any one or more clauses herein, wherein the heating assembly is an electric heating element extending along the circumferential direction around the programmed magnet.
3. The cooktop appliance of any one or more clauses herein, wherein the programmed magnet is positioned below the ceramic-glass plate.
4. The cooktop appliance of any one or more clauses herein, wherein the heating assembly forms an opening extended along the vertical direction at the reference center, and wherein the programmed magnet is positioned at the opening.
5. The cooktop appliance of any one or more clauses herein, wherein the heating assembly includes a body through which the opening is extended along the vertical direction.
6. The cooktop appliance of any one or more clauses herein, including a retainer body positioned at an upper face at the body formed at the opening, wherein the programmed magnet is positioned in the retainer body.
7. The cooktop appliance of any one or more clauses herein, wherein the opening is a counterbore.
8. The cooktop appliance of any one or more clauses herein, wherein the heating assembly is an electric heating element.
9. The cooktop appliance of any one or more clauses herein, wherein the retainer body comprises a detent configured to allow the retainer body to rest at the upper face of the body.
10. The cooktop appliance of one or more clauses herein, wherein the programmed magnet is positioned in the retainer body.
11. A cooking system, the system defining a reference center and a radial direction extending from the reference center, a circumferential direction extending relative to the reference center, and a vertical direction extending orthogonal to the radial direction, the system including a cooktop appliance including a ceramic-glass plate; a heating assembly positioned below the ceramic-glass plate; a first programmed magnet centered at the reference center, the first programmed magnet configured to generate a magnetic force along the radial direction; and a cookware device including a bottom surface, wherein a plenum is formed at the reference center at the cookware device, and wherein a second programmed magnet is positioned in the plenum.
12. The cooking system of any one or more clauses herein, wherein the second programmed magnet is configured to react to the first programmed magnet along the radial direction to position the first programmed magnet and the second programmed magnet concentric to one another.
13. The cooking system of any one or more clauses herein, wherein the first programmed magnet and the second programmed magnet are separated along the vertical direction when the cookware device is positioned onto the ceramic-glass plate.
14. The cooking system of any one or more clauses herein, wherein the magnetic force along the radial direction between the first programmed magnet and the second programmed magnet is substantially greater than a vertical magnetic force along the vertical direction.

15. The cooking system of any one or more clauses herein, wherein the heating assembly forms an opening extended along the vertical direction at the reference center, and wherein the first programmed magnet is positioned at the opening.

16. The cooking system of any one or more clauses herein, wherein the heating assembly includes a body through which the opening is extended along the vertical direction.

17. The cooking system of any one or more clauses herein, including a retainer body positioned at an upper face at the body formed at the opening, wherein the first programmed magnet is positioned in the retainer body.

18. The cooking system of any one or more clauses herein, wherein the retainer body comprises a detent configured to allow the retainer body to rest at the upper face of the body.

19. The cooking system of one or more clauses herein, wherein the programmed magnet is positioned in the retainer body.

20. The cooking system of any one or more clauses herein, wherein the heating element is a radiant heating element.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance defining a reference center and a radial direction extending from the reference center, a circumferential direction extending relative to the reference center, and a vertical direction extending orthogonal to the radial direction, the cooktop appliance comprising:

a ceramic-glass plate;

a heating assembly positioned below the ceramic-glass plate;

a programmed magnet centered at the reference center, the programmed magnet configured to generate a radial magnetic force along the radial direction substantially greater than a vertical magnetic force along the vertical direction.

2. The cooktop appliance of claim 1, wherein the heating assembly is an electric heating element extending along the circumferential direction around the programmed magnet.

3. The cooktop appliance of claim 1, wherein the programmed magnet is positioned below the ceramic-glass plate.

4. The cooktop appliance of claim 1, wherein the heating assembly forms an opening extended along the vertical direction at the reference center, and wherein the programmed magnet is positioned at the opening.

5. The cooktop appliance of claim 4, wherein the heating assembly comprises a body through which the opening is extended along the vertical direction.

6. The cooktop appliance of claim 5, comprising:

a retainer body positioned at an upper face at the body formed at the opening.

7. The cooktop appliance of claim 6, wherein the retainer body comprises a detent configured to allow the retainer body to rest at the upper face of the body.

8. The cooktop appliance of claim 6, wherein the programmed magnet is positioned in the retainer body.

9. The cooktop appliance of claim 4, wherein the opening is a counterbore.

10. The cooktop appliance of claim 1, wherein the heating assembly is an electric heating element.

11. A cooking system, the system defining a reference center and a radial direction extending from the reference center, a circumferential direction extending relative to the reference center, and a vertical direction extending orthogonal to the radial direction, the system comprising:

a cooktop appliance, comprising:

a ceramic-glass plate;

a heating assembly positioned below the ceramic-glass plate;

a first programmed magnet centered at the reference center, the first programmed magnet configured to generate a radial magnetic force along the radial direction substantially greater than a vertical magnetic force along the vertical direction; and a cookware device comprising a bottom surface, wherein a plenum is formed at the reference center at the cookware device, and wherein a second programmed magnet is positioned in the plenum.

12. The cooking system of claim 11, wherein the second programmed magnet is configured to react to the first programmed magnet along the radial direction to position the first programmed magnet and the second programmed magnet concentric to one another.

13. The cooking system of claim 11, wherein the first programmed magnet and the second programmed magnet are separated along the vertical direction when the cookware device is positioned onto the ceramic-glass plate.

14. The cooking system of claim 11, wherein the magnetic force along the radial direction between the first programmed magnet and the second programmed magnet is substantially greater than a vertical magnetic force along the vertical direction.

15. The cooking system of claim 11, wherein the heating assembly forms an opening extended along the vertical direction at the reference center, and wherein the first programmed magnet is positioned at the opening.

16. The cooking system of claim 15, wherein the heating assembly comprises a body through which the opening is extended along the vertical direction.

17. The cooking system of claim 16, comprising:

a retainer body positioned at an upper face at the body formed at the opening, wherein the first programmed magnet is positioned in the retainer body.

18. The cooking system of claim 17, wherein the retainer body comprises a detent configured to allow the retainer body to rest at the upper face of the body.

19. The cooking system of claim 11, wherein the heating element is a radiant heating element.

* * * * *